United States Patent
Koskinen

(10) Patent No.: US 10,396,966 B2
(45) Date of Patent: *Aug. 27, 2019

(54) PER-PROTOCOL DATA UNIT DELIVERY-PATH INDICATION

(71) Applicant: NOKIA TECHNOLOGIES OY, Espoo (FI)

(72) Inventor: Henri Markus Koskinen, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 15/858,753

(22) Filed: Dec. 29, 2017

(65) Prior Publication Data

US 2018/0123768 A1 May 3, 2018

Related U.S. Application Data

(63) Continuation of application No. 13/856,948, filed on Apr. 4, 2013, now Pat. No. 9,893,868.

(51) Int. Cl.
*H04L 5/00* (2006.01)
*H04W 72/04* (2009.01)
(Continued)

(52) U.S. Cl.
CPC .......... *H04L 5/0064* (2013.01); *H04L 1/1838* (2013.01); *H04L 1/1841* (2013.01);
(Continued)

(58) Field of Classification Search
None
See application file for complete search history.

(56) References Cited

U.S. PATENT DOCUMENTS

2002/0150060 A1* 10/2002 Montpetit .......... H04B 7/18521
370/316
2004/0033801 A1* 2/2004 Yi .......................... H04W 28/18
455/428

(Continued)

FOREIGN PATENT DOCUMENTS

EP 2 076 088 A1 7/2009

OTHER PUBLICATIONS

3GPP Standard; 3GPP TS.36.323, Technical Specification Group Radio Access Network; Evolved Universal Terrestrial Radio Access (E-UTRA); Packet Data Convergence Protocol (PDCP) specification (Release 10) vol. RAN WG2, No. V10.2.0, Jan. 1, 2013 (Jan. 1, 2013), pp. 1-26, XP050691603, [retrieved on Jan. 1, 2013] paragraphs [0006]-[6.2.6]. No copy provided, per MPEP 609.

(Continued)

*Primary Examiner* — Jamaal Henson
(74) *Attorney, Agent, or Firm* — Squire Patton Boggs (US) LLP

(57) ABSTRACT

Indication of delivery-path information may benefit various communication systems. For example, wireless communication systems may benefit from per-protocol data unit delivery-path indication to data recipient or from setting a timer expiry value dependent on such received information. A method can comprise sending, by a data-sending protocol entity, a control protocol data unit. The control protocol data unit can identify protocol data units destined to a data-receiving protocol entity. The method can also comprise providing in the control protocol data unit, for each of the identified protocol data units, a direct or indirect indication of at least one delay figure of a delivery path chosen for an initial transmission of the identified protocol data unit.

11 Claims, 4 Drawing Sheets

(51) Int. Cl.
*H04W 80/02* (2009.01)
*H04L 1/18* (2006.01)

(52) U.S. Cl.
CPC .......... *H04L 1/1851* (2013.01); *H04L 1/1896* (2013.01); *H04W 72/04* (2013.01); *H04W 80/02* (2013.01); *H04L 1/1809* (2013.01)

(56) References Cited

U.S. PATENT DOCUMENTS

| | | | | |
|---|---|---|---|---|
| 2004/0037327 | A1* | 2/2004 | Torsner | H04W 24/00 370/517 |
| 2004/0052212 | A1* | 3/2004 | Baillargeon | H04L 1/0002 370/235 |
| 2005/0052994 | A1* | 3/2005 | Lee | H04L 47/10 370/230 |
| 2005/0287957 | A1* | 12/2005 | Lee | H04L 1/1664 455/68 |
| 2006/0274791 | A1* | 12/2006 | Garcia | H04L 43/0864 370/508 |
| 2007/0121529 | A1* | 5/2007 | Meier | G06F 15/0225 370/256 |
| 2012/0163161 | A1* | 6/2012 | Zhang | H04L 1/1874 370/216 |

OTHER PUBLICATIONS

Technical Specification Group Radio Access Network; Radio Link Control (RLC) protocol specification (Release 11), Jan. 2, 2013 (Jan. 2, 2013), 3GPP Standard; 3GPP Ts 25.322, 3rd Generation Partnership Project (3GPP), Mobile Competence Centre; 650, Route Des Lucioles; F-06921 Sophia-Antipolis Cedex; France, pp. 1-90, XP050691616, [retrieved on Jan. 2, 2013] paragraphs [09.1]-[9.2.2.14]. No copy provided, per MPEP 609.

International Search Report Application No. PCT/EP2014/056638 dated Jul. 17, 2014. No copy provided, per MPEP 609.

3GPP TS 36.322 V11.0.0 (Sep. 2012) "3rd Generation Partnership Project; Technical Specification Group Radio Access Network; Evolved Universal Terrestrial Radio Access (E-UTRA); Radio Link Control (RLC) protocol specification (Release 11)"; pp. 1-39; 3rd Generation Partnership Project (3GPP); Mobile Competence Centre; 650, Route des Lucioles; F-06921 Sophia-Antipolis Cedex; France. No copy provided, per MPEP 609.

3GPP TS 36.322 V11.2.0 (Mar. 2013) 3rd Generation Partnership Project; Technical Specification Group Radio Access Network; Evolved Universal Terrestrial Radio Access (E-UTRA); Packet Data Convergence Protocol (PDCP) specification (Release 11); pp. 1-27; 3rd Generation Partnership Project 3GPP); Mobile Competence Centre; 650, Route des Lucioles; F-06921 Sophia-Antipolis Cedex; France. No copy provided, per MPEP 609.

3GPP TS 36.424 V11.0.0 (Sep. 2012) "3rd Generation Partnership Project; Technical Specification Group Radio Access Network; Evolved Universal Terrestrial Radio Access Network (E-UTRAN); X2 data transport (Release 11)", pp. 1-8; 3rd Generation Partnership Project (3GPP); Mobile Competence Centre; 650, Route des Lucioles; F-06921 Sophia-Antipolis Cedex; France. No copy provided, per MPEP 609.

* cited by examiner

PER-PROTOCOL DATA UNIT DELIVERY-PATH INDICATION

RELATED APPLICATION

This application is a continuation application of U.S. patent application Ser. No. 13/856,948, filed on Apr. 4, 2013. The disclosure of the prior application is hereby incorporated by reference in its entirety.

BACKGROUND

Field

Indication of delivery-path information may benefit various communication systems. For example, wireless communication systems may benefit from per-protocol data unit delivery-path indication to data recipient.

Description of the Related Art

In the Evolved Universal Terrestrial Radio Access Network (E-UTRAN) air-interface protocol stack, the Packet Data Convergence Protocol (PDCP) currently lies above the Radio Link Control (RLC) protocol. PDCP is currently defined by third generation partnership project (3GPP) technical specification (TS) 36.323, which is hereby incorporated herein by reference. RLC is defined by 3GPP TS 36.322, which is hereby incorporated herein by reference.

For PDCP, the listed 'Services expected from lower layers' comprise among others: acknowledged data transfer service, including indication of successful delivery of PDCP PDUs.

The RLC protocol [TS 36.322] uses the reordering timer, with RRC-configurable expiry time, to infer when a packet has been lost at MAC layer instead of still undergoing possible HARQ retransmissions: the timer is started when a gap in received PDUs is observed, and if the timer expires the lost packet is NACKed to the peer RLC entity (acknowledged mode), or the gap in packets is ignored when delivering data to higher layer (unacknowledged mode).

Related to studies on dual connectivity in E-UTRAN, FIG. 1 illustrates distributed radio link control and independent radio link control options. As shown in FIG. 1, in a distributed radio link control model, the RLC PDUs are assigned by the macro eNB and a subset is sent to the pico eNB. The RLC acknowledged mode PDU resegmentation mechanism, used by Rel-10 for RLC retransmissions, is repurposed at the slave eNB to fit AMD PDU segments into the scheduled transport block. Moreover, RLC retransmissions may only be handled at the macro eNB.

In an independent-RLCs model, distinct RLC entities at macro and pico handle different sub-bearers. Moreover, UE protocol architecture is different from Rel-10 CA.

Moreover, with respect to the independent-RLCs option, the master node may be provided the following feedback: whether each PDCP PDU was received by the slave node over the "X2" interface; and which PDCP PDUs the UE has indicated as successfully received to know which packets the network-side PDCP can discard.

The above will be provided if the following feedback mechanisms are in place: acknowledged data transfer over the "X2" interface, which is not present in the current data transfer over X2: see 3GPP technical specification (TS) 36.424); acknowledged data transfer over each of the RLC bearers serving the PDCP bearer, as currently specified in the RLC protocol; and the indications of successful downlink delivery of PDCP PDUs, from the slave node to the master node.

Alternatively, a continuously running ARQ mechanism can be adopted at PDCP level, which is not currently in place in the PDCP protocol, which may render all three items above unnecessary. This also implies that the RLC bearers serving the acknowledged-mode PDCP bearer could run in unacknowledged mode.

SUMMARY

According to certain embodiments, a method comprises sending, by a data-sending protocol entity, a control protocol data unit. The control protocol data unit identifies other protocol data units destined to a data-receiving protocol entity. The method also comprises providing in the control protocol data unit, for each of the identified protocol data units, a direct or indirect indication of at least one delay figure of a delivery path chosen for an initial transmission of the identified protocol data unit.

In certain embodiments, an apparatus comprises at least one processor and at least one memory including computer program code. The at least one memory and the computer program code are configured to, with the at least one processor, cause the apparatus at least to send, by a data-sending protocol entity, a control protocol data unit. The control protocol data unit identifies other protocol data units destined to a data-receiving protocol entity. The at least one memory and the computer program code are also configured to, with the at least one processor, cause the apparatus at least to provide in the control protocol data unit, for each of the identified protocol data units, a direct or indirect indication of at least one delay figure of a delivery path chosen for an initial transmission of the identified protocol data unit.

An apparatus, according to certain embodiments, comprises sending means for sending, by a data-sending protocol entity, a control protocol data unit. The control protocol data unit identifies other protocol data units destined to a data-receiving protocol entity. The apparatus also comprises providing means for providing in the control protocol data unit, for each of the identified protocol data units, a direct or indirect indication of at least one delay figure of a delivery path chosen for an initial transmission of the identified protocol data unit.

A non-transitory computer-readable medium is, in certain embodiments, encoded with instructions that, when executed in hardware, perform a process. The process comprises sending, by a data-sending protocol entity, a control protocol data unit. The control protocol data unit identifies other protocol data units destined to a data-receiving protocol entity. The process also comprises providing in the control protocol data unit, for each of the identified protocol data units, a direct or indirect indication of at least one delay figure of a delivery path chosen for an initial transmission of the identified protocol data unit.

A computer program, according to certain embodiments, comprising program instructions which, when loaded into the apparatus, cause a computer system to perform a process. The process comprises sending, by a data-sending protocol entity, a control protocol data unit. The control protocol data unit identifies other protocol data units destined to a data-receiving protocol entity. The process also comprises providing in the control protocol data unit, for each of the identified protocol data units, a direct or indirect indication of at least one delay figure of a delivery path chosen for an initial transmission of the identified protocol data unit.

According to certain embodiments, a method comprises receiving, from a data-sending protocol entity, a control protocol data unit. The control protocol data unit identifies other protocol data units destined to a data-receiving protocol entity. The method also comprises retrieving from the control protocol data unit, for at least one of the identified protocol data units, a direct or indirect indication of at least one delay figure of a delivery path chosen for an initial transmission of the identified protocol data unit. The method further comprises applying the at least one delay figure to determine a waiting time in relation to a gap in received protocol data units.

In certain embodiments, an apparatus comprises at least one processor and at least one memory including computer program code. The at least one memory and the computer program code are configured to, with the at least one processor, cause the apparatus at least to receive, from a data-sending protocol entity, a control protocol data unit. The control protocol data unit identifies other protocol data units destined to a data-receiving protocol entity. The at least one memory and the computer program code are also configured to, with the at least one processor, cause the apparatus at least to retrieve from the control protocol data unit, for at least one of the identified protocol data units, a direct or indirect indication of at least one delay figure of a delivery path chosen for an initial transmission of the identified protocol data unit. The at least one memory and the computer program code are further configured to, with the at least one processor, cause the apparatus at least to apply the at least one delay figure to determine a waiting time in relation to a gap in received protocol data units.

An apparatus, according to certain embodiments, comprises receiving means for receiving, from a data-sending protocol entity, control protocol data unit. The control protocol data unit identifies other protocol data units destined to a data-receiving protocol entity. The apparatus also comprises retrieving means for retrieving from the control protocol data unit, for at least one of the identified protocol data units, a direct or indirect indication of at least one delay figure of a delivery path chosen for an initial transmission of the identified protocol data unit. The apparatus further comprises applying means for applying the at least one delay figure to determine a waiting time in relation to a gap in received protocol data units.

A non-transitory computer-readable medium is, in certain embodiments, encoded with instructions that, when executed in hardware, perform a process. The process comprises receiving, from a data-sending protocol entity, control protocol data unit. The control protocol data unit identifies other protocol data units destined to a data-receiving protocol entity. The process also comprises retrieving from the control protocol data unit, for at least one of the identified protocol data units, a direct or indirect indication of at least one delay figure of a delivery path chosen for an initial transmission of the identified protocol data unit. The process further comprises applying the at least one delay figure to determine a waiting time in relation to a gap in received protocol data units.

A computer program, in certain embodiments, comprising program instructions which, when loaded into the apparatus, cause a computer system to perform a process. The process comprises receiving, from a data-sending protocol entity, control protocol data unit. The control protocol data unit identifies other protocol data units destined to a data-receiving protocol entity. The process also comprises retrieving from the control protocol data unit, for at least one of the identified protocol data units, a direct or indirect indication of at least one delay figure of a delivery path chosen for an initial transmission of the identified protocol data unit. The process further comprises applying the at least one delay figure to determine a waiting time in relation to a gap in received protocol data units.

BRIEF DESCRIPTION OF THE DRAWINGS

For proper understanding of the invention, reference should be made to the accompanying drawings, wherein.

DETAILED DESCRIPTION

Figure 1:
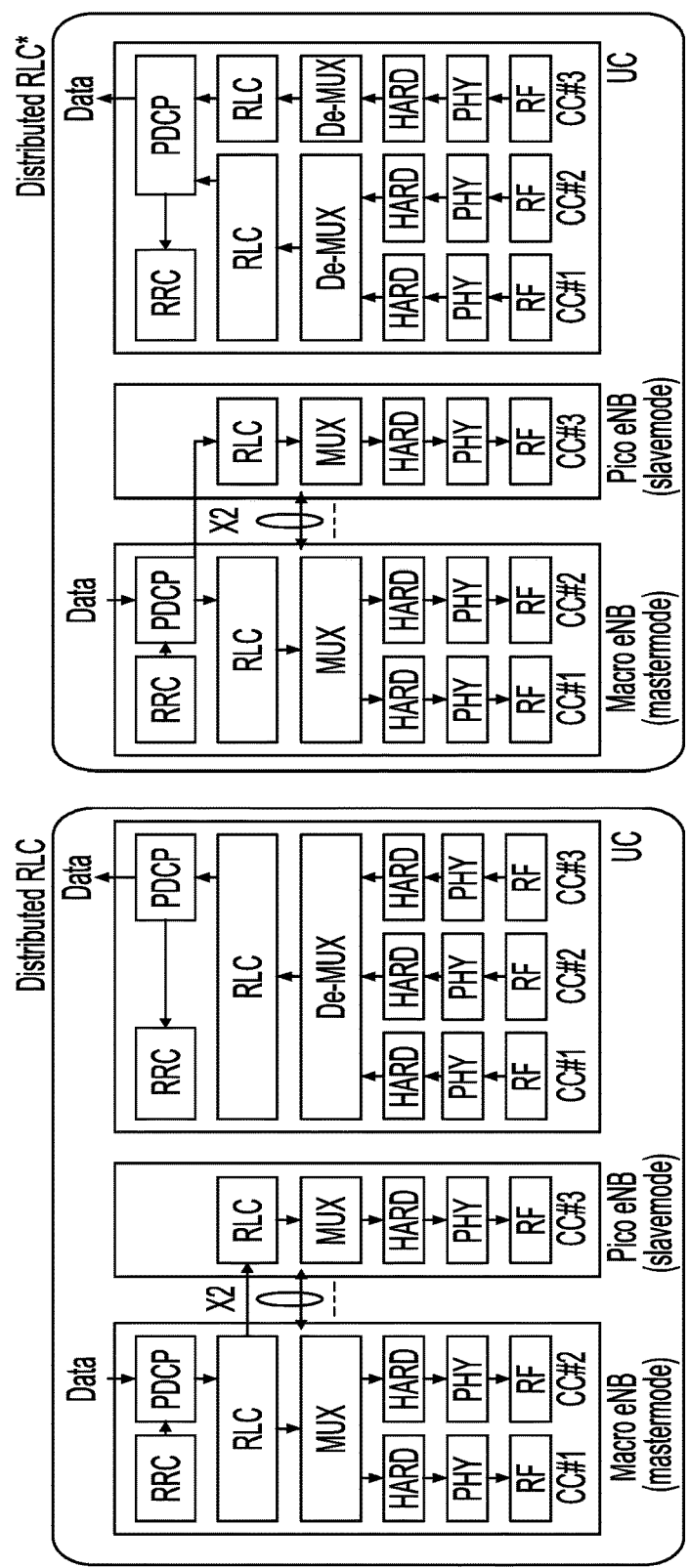
FIG. 1 illustrates distributed radio link control and independent radio link control options.

Certain embodiments may be applicable both to a distributed-RLC option and to an independent-RLCs option. In certain embodiments, it is assumed that automatic repeat request (ARQ) at PDCP is being used, in which case a timer, such as a reordering timer, can be used at PDCP to infer packet losses as with RLC.

In certain embodiments, it is assumed that a data-sending protocol entity can choose for each packet sent, one of more than one delivery paths each with different expected delay for the packet to come through. For example, the delay of sending a packet through the slave node may exceed that of direct transmission from the master node at least by the "X2"-transfer delay. Moreover, the data-receiving protocol entity can use a mechanism like RLC's timer to infer when a PDU has really been lost in transfer at the lower protocol layer.

In the distributed-RLC option, the protocol of interest may be RLC. In the independent-RLCs option, the protocol of interest may be PDCP.

In such a scenario, when the data-receiving protocol entity observes a gap in the sequence of received PDUs, the data-receiving protocol entity does not know much about the worst-case transmission-delay difference(s), including components such as "X2"-transfer delay and HARQ retransmissions at MAC, between the missing PDU(s) and the received PDU that created the reception gap, to infer when that missing PDU(s) has been lost in transfer at the lower protocol layer. As a result, packets gone missing at the lower layer can only be NACKed by the receiving side to the sending side (in the case of acknowledged-mode data transfer), or ignored in the delivery of SDUs to higher layer (in the case of unacknowledged-mode data transfer) under worst-of-worst case assumptions, which then appears as longer-than-necessary transmission delay to the higher protocol layer to which the PDUs are eventually delivered.

Certain embodiments provide a per-PDU delivery-path indication to data recipient and certain embodiments provide a timer expiry value based on such indications.

Providing a per-PDU delivery-path indication to data recipient can entail the data-sending protocol entity sending control PDUs, each of which identifies other PDUs, for example by their SNs, destined to the data-receiving protocol entity. The control PDUs can also identify, for each identified PDU, a direct or indirect indication of at least one delay figure, for example the best-case delay and the worst-case delay, of the delivery path chosen for the initial transmission of that PDU. An example of indirect indication is the lower-layer protocol-bearer, if RLC, or protocol-connection, if MAC, through which that PDU was, or will be, sent, in which case the associated delay figures for those paths have been previously configured by RRC at bearer configuration.

Certain embodiments provide timer expiry value based on such delay values. In general, there are at least two PDUs involved when the timer is started: the PDU received that created a gap in the sequence of received PDUs, and the one or more missing PDUs within that newly appeared gap. The second component of this invention is that the expiry value of the timer started in such a situation depends on at least one delay figure previously indicated for at least one of the involved PDUs. If none are available, a worst-case value can be used. The worst-case value can be a longest conceivable expiry value.

Various implementations are possible. For example, at bearer configuration, a best-case associated minimum delay D1 and worst-case associated maximum delay D2 can be configured by RRC to each lower-layer protocol-bearer, if RLC, or protocol-connection, if MAC, delivering data for this bearer.

When the timer is started, the expiry value can be the maximum, over all missing PDUs i in the observed reception gap, of D2(i)−D1 (the PDU received that created the gap), where the 'Dx' of each PDU is determined from a previously received delivery-path indication. If either or both of the associated D1, D2 are unavailable, the longest of the configured D2s and the shortest of the configured D1s can be used in this determination as needed.

Figure 2:
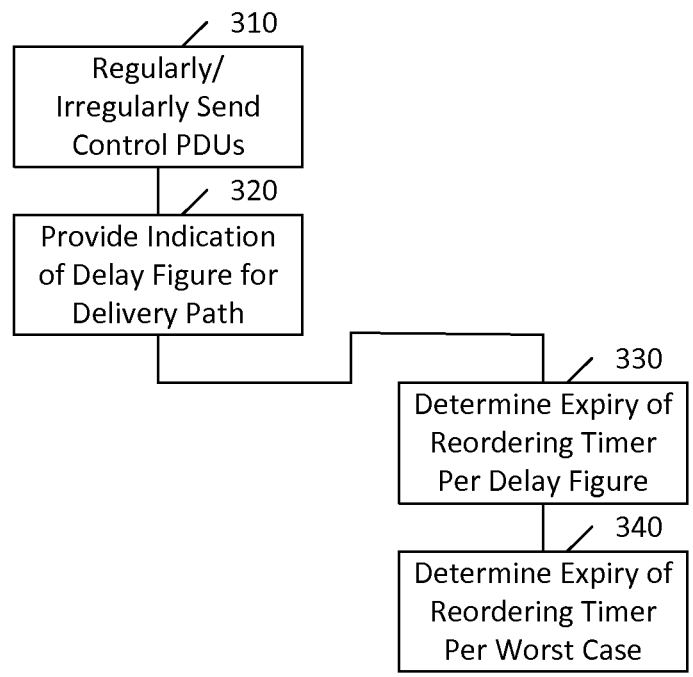
FIG. 2 illustrates a method according to certain embodiments.

FIG. 2 illustrates a method according to certain embodiments. As shown in FIG. 2, a method can comprise at a transmitting side, at 310, regularly or irregularly sending, by a data-sending protocol entity, a control protocol data unit. The control protocol data unit can identify protocol data units destined to a data-receiving protocol entity. The control protocol data unit can identify the protocol data units by, for example, sequence number.

The method can also comprise, at 320, providing in the control protocol data unit, for each identified protocol data units, a direct or indirect indication of at least one delay figure of a delivery path chosen for an initial transmission of the identified protocol data unit. The at least one delay figure can comprise at least one of a best-case delay and a worst-case delay.

The method can also comprise at a receiving side, at 330, determining an expiry value of a timer based on at least one delay figure previously indicated for at least one protocol data unit. The at least one protocol data unit can comprise at least one of a missing protocol data unit within a gap and a received protocol data unit that created the gap.

The method can further comprise, at 340, determining an expiry value of a timer based on a worst-case value of the at least one delay figure. The at least one delay figure can comprise at least one of a preconfigured best-case minimum delay and a preconfigured worst-case delay, wherein the at least one delay figure is preconfigured at bearer configuration. The at least one delay figure can comprise a maximum delay of all missing protocol data units in a gap and a minimum delay of a received protocol data unit that created the gap.

Figure 3:
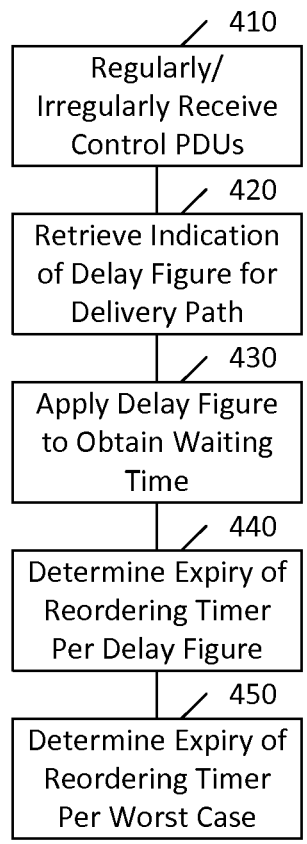
FIG. 3 illustrates another method according to certain embodiments.

FIG. 3 illustrates a method according to certain embodiments. As shown in FIG. 3, a method can comprise, at 410, regularly or irregularly receiving, from a data-sending protocol entity, a control protocol data unit. The control protocol data unit can identify protocol data units destined to a data-receiving protocol entity. The control protocol data unit can identify the protocol data units by, for example, sequence number.

The method can also comprise, at 420, retrieving from the control protocol data unit, for at least one identified protocol data unit (for example, for each identified protocol data unit), a direct or indirect indication of at least one delay figure of a delivery path chosen for an initial transmission of the identified protocol data unit. The at least one delay figure can comprise at least one of a best-case delay and a worst-case delay.

The method can further comprise, at 430, applying the at least one delay figure to determine a waiting time in relation to a gap in received protocol data units.

The method can also comprise, at 440, determining an expiry value of a timer based on at least one delay figure previously indicated for at least one protocol data unit. The at least one protocol data unit can comprise at least one of a missing protocol data unit within a gap and a received protocol data unit that created the gap.

The method can further comprise, at 450, determining an expiry value of a timer based on a worst-case value of the at least one delay figure. The at least one delay figure can comprise at least one of a preconfigured best-case minimum delay and a preconfigured worst-case delay, wherein the at least one delay figure is preconfigured at bearer configuration. The at least one delay figure can comprise a maximum delay of all missing protocol data units in a gap and a minimum delay of a received protocol data unit that created the gap.

Figure 4:
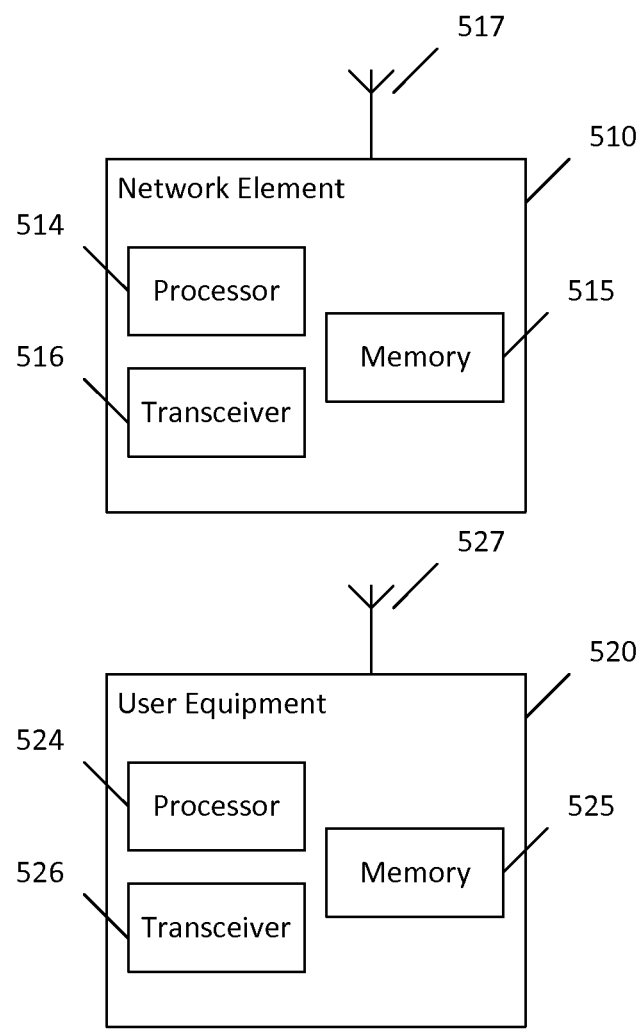
FIG. 4 illustrates a system according to certain embodiments.

FIG. 4 illustrates a system according to certain embodiments of the invention. It should be understood that each block of the flowchart of FIG. 2 or 3 and any combination thereof may be implemented by various means or their combinations, such as hardware, software, firmware, one or more processors and/or circuitry. In one embodiment, a system may comprise several devices, such as, for example, network element 510 and user equipment (UE) or user device 520. The system may comprise more than one UE 520 and more than one network element 510, although only one of each is shown for the purposes of illustration. A network element can be an access point, a base station, an eNode B (eNB), server, host, or any of the other network elements discussed herein. Each of these devices may comprise at least one processor or control unit or module, respectively indicated as 514 and 524. At least one memory may be provided in each device, and indicated as 515 and 525, respectively. The memory may comprise computer program instructions or computer code contained therein. One or more transceiver 516 and 526 may be provided, and each device may also comprise an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally configured for wired communication, in addition to wireless communication, and in such a case antennas 517 and 527 may illustrate any form of communication hardware, without being limited to merely an antenna. Likewise, some network elements 510 may be solely configured for wired communication, and such cases antenna 517 may illustrate any form of wired communication hardware, such as a network interface card.

Transceivers 516 and 526 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example.

It should also be appreciated that according to the "liquid" or flexible radio concept, the operations and functionalities may be performed in different entities, such as nodes, hosts or servers, in a flexible manner. In other words, "division of labour" may vary case by case. One possible use is to make a network element to deliver local content. One or more functionalities may also be implemented as a virtual application that is as software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In an exemplary embodiment, an apparatus, such as a node or user device, may comprise means for carrying out embodiments described above in relation to FIG. 2 or 3. Processors 514 and 524 may be embodied by any computational or data processing device, such as a central processing unit (CPU), application specific integrated circuit (ASIC), or comparable device. The processors may be implemented as a single controller, or a plurality of controllers or processors.

F or firmware or software, the implementation may comprise modules or unit of at least one chip set, for example, procedures, functions, and so on.

Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 510 and/or UE 520, to perform any of the processes described above (see, for example, FIGS. 2 and 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 4 illustrates a system including a network element 510 and a UE 520, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary

ACK Positive acknowledgement
AM Acknowledged Mode
NACK Negative acknowledgement
RLC Radio Link Control
PDCP Packet Data Convergence Protocol
PDU Protocol Data Unit
SN Sequence Number
UM Unacknowledged Mode

I claim:

1. A method, comprising:
sending, by a data-sending protocol entity, a control protocol data unit, wherein said control protocol data unit identifies other protocol data units destined to a data-receiving protocol entity; and
providing in the control protocol data unit, for each of said identified protocol data units, a direct indication of at least one delay figure of a delivery path chosen for an initial transmission of the identified protocol data unit.

2. The method of claim 1, wherein the control protocol data unit identifies the other protocol data units by sequence number.

3. The method of claim 1, wherein the at least one delay figure comprises at least one of a best-case delay and a worst-case delay.

4. An apparatus, comprising:
at least one processor; and
at least one memory including computer program code,
wherein the at least one memory and the computer program code are configured to, with the at least one processor, cause the apparatus at least to
send, by a data-sending protocol entity, a control protocol data unit, wherein said control protocol data unit identifies other protocol data units destined to a data-receiving protocol entity; and
provide in the control protocol data unit, for each of said identified protocol data units, a direct indication of at least one delay figure of a delivery path chosen for an initial transmission of the identified protocol data unit.

5. The apparatus of claim 4, wherein the control protocol data unit identifies the other protocol data units by sequence number.

6. The apparatus of claim 4, wherein the at least one delay figure comprises at least one of a best-case delay and a worst-case delay.

7. A method, comprising:
   receiving, from a data-sending protocol entity, a control protocol data unit, wherein said control protocol data unit identifies other protocol data units destined to a data-receiving protocol entity;
   retrieving from the control protocol data unit, for at least one of said identified protocol data units, a direct indication of at least one delay figure of a delivery path chosen for an initial transmission of the identified protocol data unit; and
   applying the at least one delay figure to determine a waiting time in relation to a gap in received protocol data units.

8. The method according to claim 7, wherein the at least one delay figure comprises at least one of a best-case delay and a worst-case delay.

9. The method according to claim 7, further comprising:
   using a timer for controlling the waiting time, and
   determining an expiry value of the timer based on at least one delay figure previously indicated for at least one protocol data unit.

10. The method according to claim 7, wherein the at least one delay figure comprises a maximum delay of all missing protocol data units in a gap and a minimum delay of a received protocol data unit that created the gap.

11. The method according to claim 7, further comprising:
    using a timer for controlling the waiting time, and
    determining an expiry value of the timer based on at least one delay figure previously indicated for at least one protocol data unit,
    wherein the at least one protocol data unit comprises at least one of a protocol data unit whose reception created a gap in the sequence of received protocol data units, and a not-received protocol data unit within said gap.

* * * * *